(12) United States Patent
Anderson et al.

(10) Patent No.: US 6,289,596 B1
(45) Date of Patent: Sep. 18, 2001

(54) DOWNHOLE TOOL

(75) Inventors: Charles Abernethy Anderson, Banchory-Devenick; Alan Martyn Eddison, Stonehaven, both of (GB)

(73) Assignee: Andergauge Limited, Scotland (GB)

(*) Notice: Subject to any disclaimer, the term of this patent is extended or adjusted under 35 U.S.C. 154(b) by 0 days.

(21) Appl. No.: 09/125,900

(22) PCT Filed: Feb. 27, 1997

(86) PCT No.: PCT/GB97/00547

§ 371 Date: Sep. 3, 1998

§ 102(e) Date: Sep. 3, 1998

(87) PCT Pub. No.: WO97/39220

PCT Pub. Date: Oct. 23, 1997

(30) Foreign Application Priority Data

Feb. 29, 1996 (GB) .................................................... 9604279

(51) Int. Cl.[7] .................................................... E21B 47/024
(52) U.S. Cl. .................................................... 33/308
(58) Field of Search .................................. 33/304–314, 391, 33/302, 397, 398, 815, 542, 544, 396, 401, 402

(56) References Cited

U.S. PATENT DOCUMENTS

| 3,059,342 | * | 7/1996 | Beal | 33/308 |
|---|---|---|---|---|
| 3,176,407 | | 4/1965 | Alder et al. | 33/307 |
| 3,983,948 | * | 10/1976 | Jeter | 33/306 |
| 4,132,004 | * | 1/1979 | Deschenes et al. | 33/402 |
| 4,216,590 | * | 8/1980 | Kelly | 33/304 |
| 4,235,021 | * | 11/1980 | Claycomb | 33/307 |
| 4,351,116 | * | 9/1982 | Scott, Jr. | 33/307 |
| 4,462,094 | * | 7/1984 | Bowden et al. | 33/308 |
| 4,484,186 | * | 11/1984 | Wood et al. | 33/402 |
| 4,570,353 | * | 2/1986 | Evans et al. | 33/313 |
| 4,592,147 | * | 6/1986 | Herman | 33/402 |
| 4,627,172 | * | 12/1986 | Afromowitz | 33/402 |
| 4,700,479 | * | 10/1987 | Saito et al. | 33/402 |
| 5,201,129 | * | 4/1993 | Ukawa | 33/402 |
| 5,537,753 | * | 7/1996 | Otte et al. | 33/304 |

FOREIGN PATENT DOCUMENTS

| 0 474 459 | 3/1992 | (EP) | 33/301 |
|---|---|---|---|
| 0 539 020 A1 | 4/1993 | (EP) . | |
| 2251307 | * 7/1992 | (GB) | 33/304 |

OTHER PUBLICATIONS

Figs. 1–3 of GB 508214, 1939.*

* cited by examiner

Primary Examiner—Diego Gutierrez
Assistant Examiner—Gail Verbitsky
(74) Attorney, Agent, or Firm—Alston & Bird LLP

(57) ABSTRACT

A mounting arrangement for a pendulum in a downhole drift indicator comprises a plunger and a pendulum defining respective normally spaced apart first and second surfaces, and a pivot connection between the plunger and pendulum including a connecting pivot member. On the pivot connection being subject to a predetermined load the first and second surfaces engage to limit the load experienced by the pivot member. Also disclosed is a drift Indicator biassing arrangement, the arrangement including a housing partially defining a volume for containing a fluid reservoir, a signalling plunger and floating piston defining respective wall portions of the volume and being moveable relative to the housing. A spring acts on the piston to compress the fluid in the volume and move the signalling plunger relative to the housing.

19 Claims, 3 Drawing Sheets

DOWNHOLE TOOL

Figures 1, 2, 3:
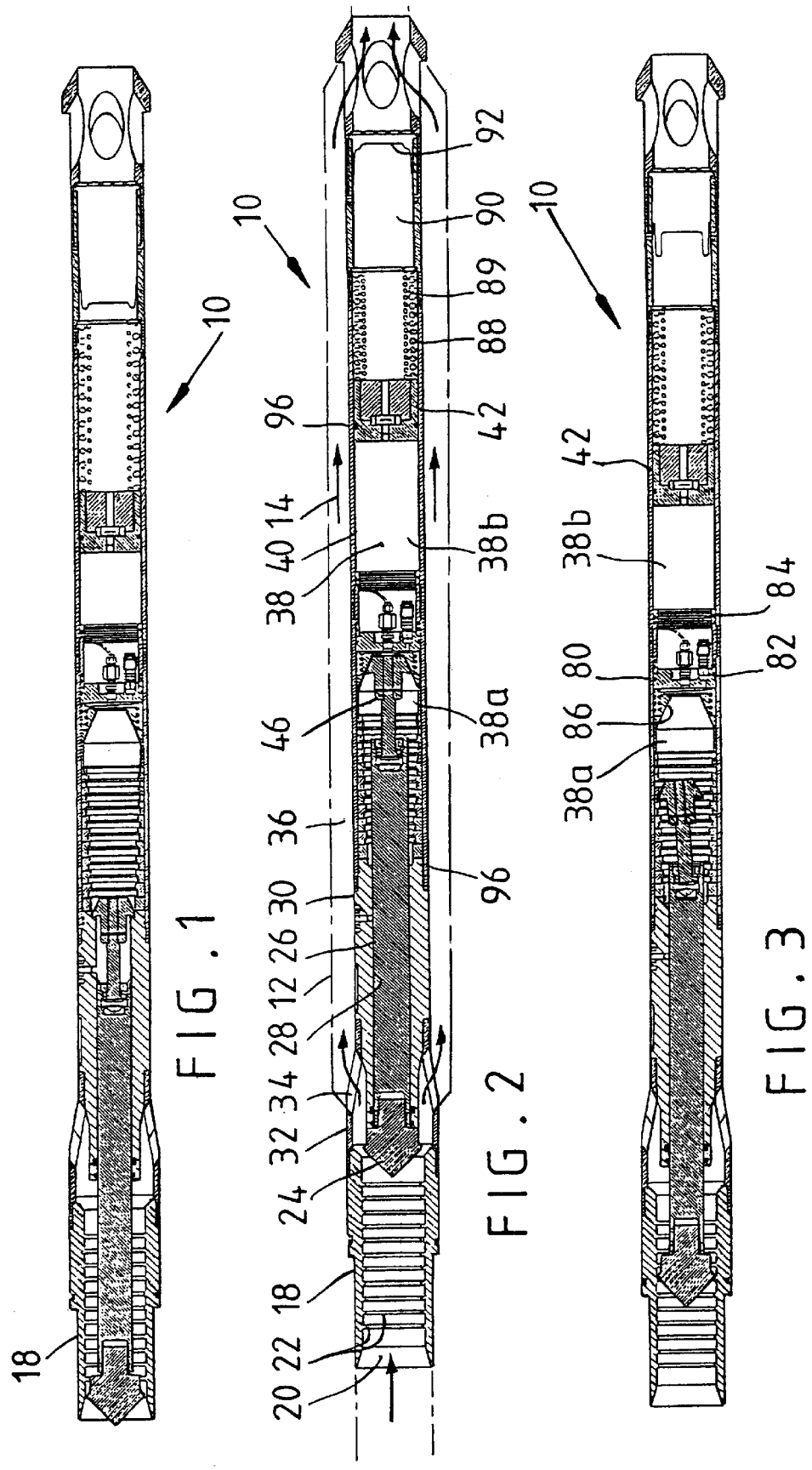

This invention relates to a downhole tool, and in particular but not exclusively to a drift indicator for use in measuring the deviation from the vertical of a drilled hole. The invention also relates to elements of such a downhole tool, and to an arrangement for mounting a pivotable member, and to a biassing arrangement.

Drift indicators are utilised to facilitate drilling operations by providing surface recordings of hole deviation. The tool is generally located in the drill string adjacent the drill bit. One of the most widely used drift indicators currently available is the Teledrift (Trade Mark) tool as supplied by Dies Downhole Drilling Inc, of Oklahoma City, Okla. The tool is provided with a pendulum that moves along a series of graduated stop shoulders within a fluid reservoir, and a signalling plunger that traverses a series of seven annular restrictions to produce pressure pulses in the mud stream. The plunger is biassed upwardly by a spring within the fluid reservoir but during normal drilling operations is pushed to a lower position by the flow of drilling mud over the head of the plunger.

To measure the hole deviation, or drift, the bit is pulled off bottom, rotation of the string is stopped and the mud pump is stopped. The plunger, under the influence of the spring, rises, passing one or more annular restrictions and lifting the pendulum, until the pendulum engages one of the stop shoulders; the smaller the degree of drift, the further the pendulum will travel without engaging a shoulder. If the mud pumps are started once more, the plunger is pushed downwardly past the annular restrictions. As the plunger passes each restriction there is an increase in mud pressure above the plunger and this is detected at the surface, in the form of a mud pressure pulse, the number of pulses indicating the degree of drift; typically, each pulse represents a 0.5 degree deviation from the vertical. The pulses are produced at 10–30 second intervals, and the first pulse usually appears within 10 to 15 seconds of starting the pump.

The mud pressure is measured at a surface chart recorder which is linked to a surface mud line via a is diaphragm and oil-filled hose. The drill operator determines the degree of drift by examining the print-out from the chart recorder, counting the number of pulses detected, and correlating the pulse count with a set of tables supplied with the tool.

It is among the objectives of the embodiments of the present invention to provide improved downhole tools, and also an improved drift indicator.

According to the present invention there is provided a mounting arrangement for a pivotable member, the arrangement comprising first and second members defining respective normally spaced apart first and second surfaces, and a pivot connection between the members including a pivot member connecting the members, the arrangement being such that on the pivot connection being subject to a predetermined load the first and second surfaces engage to limit the load experienced by the pivot member.

In use, the arrangement permits provision of a sensitive pivot connection which does not have to be constructed to withstand high loads which the first and second members may experience. The arrangement may be incorporated in a downhole drift indicator, wherein the first member is a plunger and the second member a pendulum.

Preferably, the pivot connection permits pivoting of the second member relative to the first member, the pivot member defining a pivot surface for supporting the second member. The pivot surface may be of relatively small area, for example a point or line, as the surface will not be subject to high loads and the corresponding force concentration that would result.

Preferably also, the pivot member is linked to the first member via a resilient deformable mounting which deforms under said predetermined load to allow the second member to move relative to the first member and the first and second surfaces to engage. Most preferably, the pivot member is spring mounted.

According to another aspect of the present invention there is provided a downhole drift indicator comprising:

a housing for location in a drill string and defining a passage for drilling fluid;

a restriction body defining a series of flow restrictions in the passage;

a restriction member for cooperating with the flow restrictions to define a restricted flow area when located adjacent a flow restriction, said restriction member being moveable in one direction relative to the housing under the influence of the flow of drilling fluid through the passage, towards a first position;.

return means for biassing the restriction member in the other direction, towards a second position; and a drift responsive member being moveable relative to the housing and pivotally connected to the restriction member, the pivot connection including a pivot member connecting the restriction member and the drift responsive member, the arrangement being such that on the pivot connection being subject to a predetermined load surfaces of the restriction member and drift responsive member engage to limit the load experienced by the pivot member, the degree of movement of said drift responsive member in said other direction from a respective first position being related to the inclination of the housing, the arrangement being such that, in use, reducing the flow of drilling fluid through the passage results in movement of said restriction member in said other direction from said first position until arrested by the drift responsive member, and restarting the flow of fluid resulting in movement of said restriction member from the arrested position towards said first position, the reduction in flow area resulting as the restriction member passes each flow restriction producing a pressure pulse in the drilling fluid, which pulse is detectable at the surface, the number of pulses indicating the degree of drift.

Preferably, the restriction member cooperates with the flow restrictions to define a minimal flow area when located adjacent a flow restriction such that, in use, the magnitude of the pulses is such that the pulses may be counted by the operator simply by monitoring an existing drilling fluid pressure gauge at the surface. This obviates the requirement to provide pressure sensors and chart printers, considerably simplifying the monitoring of drift of a hole being drilled.

Preferably also, the flow area defined between the restriction member and an adjacent restriction is no more than 60% of the flow area when the restriction member is spaced from a restriction. Most preferably, the restricted flow area is around 40% of the flow area between pulses.

Preferably also, the drift responsive member is adapted to engage a selected one of a series of graduated engagement members defined by the housing. The engagement members may be in the form of annular or part-annular teeth, and the pivotally mounted drift responsive member may be a pendulum. The pendulum is preferably located within a fluid reservoir, isolated from the drilling fluid. To permit pressure equalisation, to accommodate movement of the restriction member, the reservoir preferably includes a moveable wall, most preferably in the form of a floating piston.

To allow the pulses produced on movement of the restriction member to be more easily detected, it is preferable that damping means is provided for damping the movement of the restriction member and the drift responsive member. Preferably, the damping means only permits movement of the restriction member once a predetermined fluid pressure force is exerted on the restriction member. The damping arrangement may include valve means for limiting fluid flow between parts of the fluid reservoir and such a damping arrangement preferably includes a coiled tube and may also include a check valve.

Preferably also, the return means acts on the restriction member via the fluid reservoir. Most preferably, the return means acts against the floating piston. The return means preferably maintains the fluid reservoir under pressure.

According to a further aspect of the present invention there is provided a biassing arrangement, the arrangement including a housing partially defining a volume for containing a fluid reservoir, first and second members defining respective wall portions of the volume and being moveable relative to the housing, and biassing means for acting on the second member to transfer force via the fluid in the volume and move the first member relative to the housing.

In use, the invention provides advantages over biassing arrangements including such fluid reservoirs, particularly in downhole tools, in which the biassing means acts directly on a first member and is, for example, located within the volume. In such arrangements the movement of the first member under the influence of the biassing means may result in a drop in pressure in the volume, possibly to a negative pressure relative to the surrounding fluid, such that surrounding fluid may be drawn into the volume. Further, the pressure drop may result in undesirable cavitation in a liquid medium in the volume.

In particular, the arrangement of the present invention may be incorporated in a downhole drift indicator, wherein the first member is a signalling plunger and the second member is a floating piston.

Preferably, the biassing means maintains the fluid under positive pressure. This positive pressure energises any seals between the housing and the members defining the volume, minimising the possibility of fluid leaks.

According to another aspect of the present invention there is provided a downhole drift indicator comprising:
   a housing for location in a drill string and defining a passage for drilling fluid;
   a restriction body defining a series of flow restrictions in the passage;
   a restriction member for cooperating with the flow restrictions to define a restricted flow area when located adjacent a flow restriction, said restriction member being moveable in one direction relative to the housing under the influence of the flow of drilling fluid through the passage, towards a first position;
   return means for biassing the restriction member in the other direction, towards a second position, the return means including a sleeve partially defining a volume containing a fluid reservoir, the restriction member and a second member defining respective wall portions of the volume and being moveable relative to the housing, and biassing means for acting on the second member to compress the fluid in the volume and move the restriction member relative to the housing; and
   a drift responsive member being moveable relative to the housing and connected to the restriction member,
   the degree of movement of said drift responsive member in said other direction from a respective first position being related to the inclination of the housing, the arrangement being such that, in use, reducing the flow of drilling fluid through the passage results in movement of said restriction member in said other direction from said first position until arrested by the drift responsive member, and restarting the flow of fluid resulting in movement of said restriction member from the arrested position to said first position, the reduction in flow area resulting as the restriction member passes each flow restriction producing a pressure pulse in the drilling fluid, which pulse is detectable at the surface, the number of pulses indicating the degree of drift.

Preferably, the biassing means is in the form of one or more springs, and may be located within a further fluid reservoir.

Figure 4:
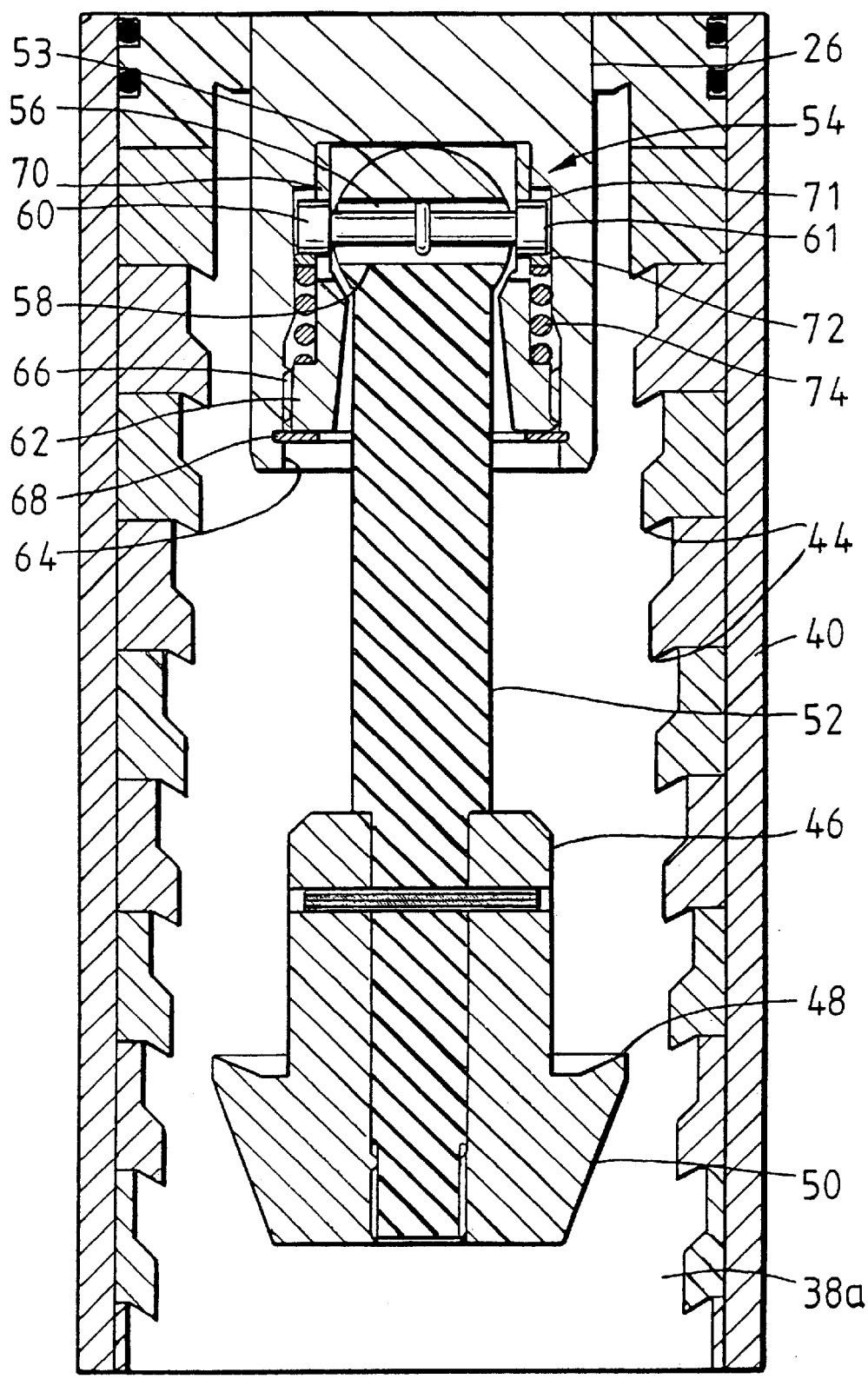
Figure 5:
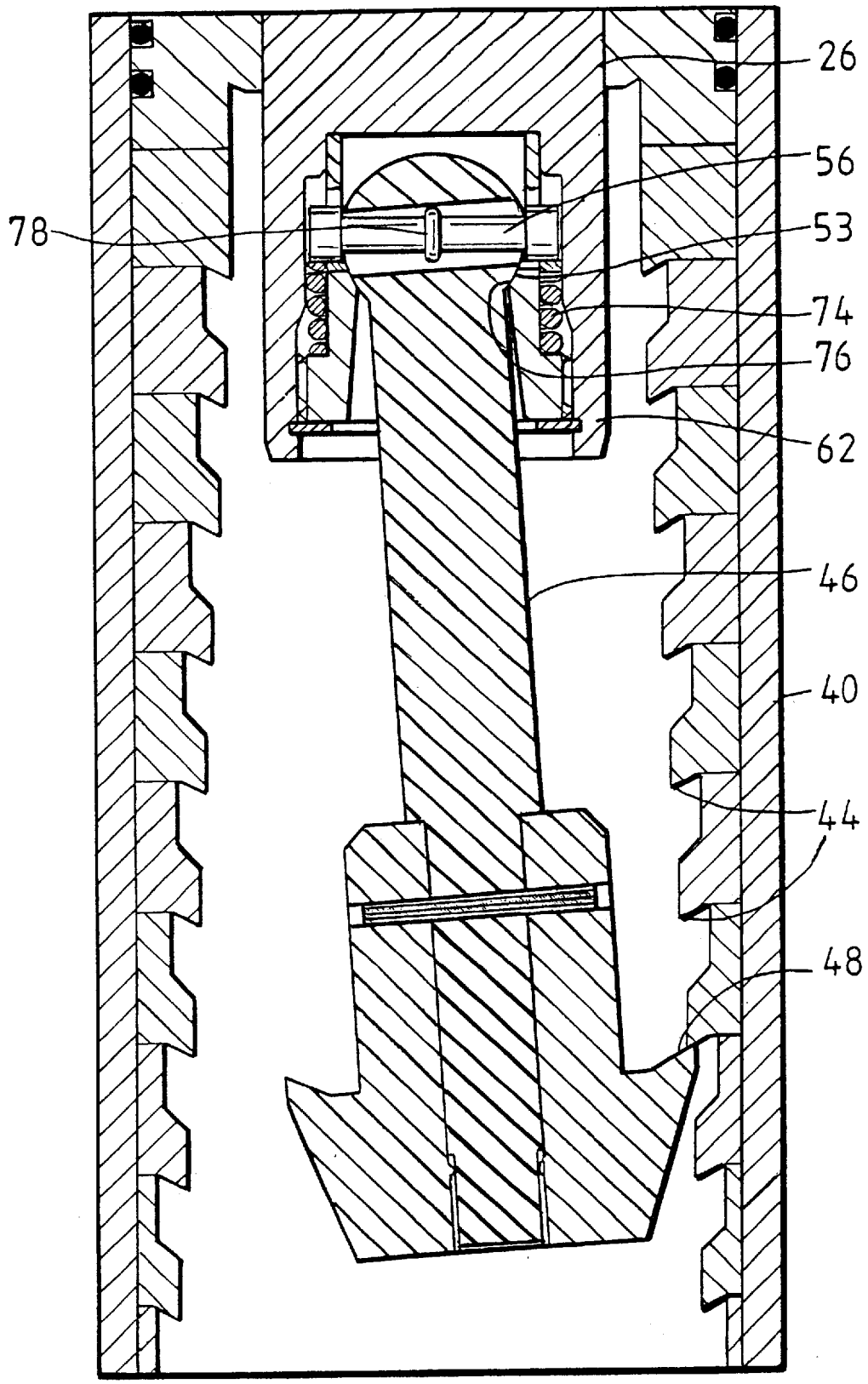

These and other aspects of the present invention will now be described, by way of example, with reference to the accompanying drawings, in which:

FIGS. 1, 2 and 3 are sectional views of a drift indicator in accordance with a preferred embodiment of the present invention, illustrating the indicator in three difference configurations; and FIGS. 4 and 5 are enlarged sectional views of the pendulum of the drift indicator of FIG. 1, illustrating the pendulum in two different positions.

Reference is first made to FIGS. 1, 2 and 3 of the drawings, which illustrate a downhole drift indicator 10 in accordance with a preferred embodiment of the present invention. In use, the drift indicator 10 is located within an appropriate sub forming part of a drill string. The drift indicator 10 and the sub in which the indicator is is positioned are configured to allow mud to flow through and around the indicator 10, FIG. 2 illustrating the sub bore outline 12, and the mud flow path 14.

The upper end of the indicator 10 (towards the left hand side of the Figures) is in the form of a tubular restriction body 18 with a throughpassage 20 defining a series of restrictions 22. Positioned within the passage 20 is a restriction member 24 which, as will be described, co-operates with the flow restrictions 22 to define a restricted flow area where located adjacent to a flow restriction 22. The restriction member 24 forms the head of a plunger 26 which is slidable in a bore 28 defined by a portion of the indicator body 30. The restriction body 18 is joined to the body portion 30 by a tapered sleeve 32 defining ports 34 to allow flow of fluid from the passage 20 into an annulus 36 between the exterior of the body portion 30 and the sub bore wall 12.

The lower end of the plunger 26 extends into an oil filled volume 38 defined by a sleeve 40 joined to the lower end of the body portion 30 and a floating piston 42. As will be described below, the volume 38 is divided into two parts 38*a*, 38*b* by a damping mechanism.

Reference is now also made to FIGS. 4 and 5 of the drawings, which illustrate drift detection means comprising a series of nine annular graduated teeth 44 defining a taper and mounted on the sleeve 40, and a pendulum 46 pivotally mounted to the lower end of the plunger 26, and provided with a single annular tooth 48 adapted to engage with one of the teeth 44. As may be seen from FIGS. 4 and 5, the pendulum comprises a pendulum bob 50 defining the tooth 48, the bob 50 being threaded and pinned to the lower end of a pendulum shaft 52. The upper end of the shaft 52 is pivotally connected to the lower end of the plunger 26 via a pivot connection 54 including a pivot pin 56. The upper end of the shaft 52 defines a spherical ball 53 and with a bore 52 therethrough to accommodate the pin 56, the pin ends 60, 61 being mounted in a support bushing 62 located in a recess 64 in the lower end of the plunger 26. The bushing 62 engages a thread 66 defined within the recess 64 and is further retained in place by a spring clip 68. The pin ends 60, 61 pass through apertures 70, 71 in the upper end of the bushing 62 and normally rest upon a washer 72 supported by a bushing-mounted spring 74, as illustrated in FIG. 4. However, when the tooth 48 engages with one of the teeth 44 on upward movement of the plunger 26 and pendulum 46, the spring 74 is compressed such that the spherical ball 53 engages a corresponding seat 76 defined by the bushing 62, such that the maximum load experience by the pin 56 equals the force applied by the compressed spring 74, as shown in FIG. 5. This arrangement allows the pendulum 46 to be normally mounted on a small area pivot surface defined by a larger diameter central portion 78 of the pin 56.

As noted above, the sleeve 40 defines an enclosed volume 38 which, in use, is filled with oil, and to accommodate movement of the plunger 26 the floating piston 42 defines a movable lower wall. Further, this oil reservoir 38 is internally sub-divided by a fixed wall 80 providing mounting for a crack valve 82 and a coil tube 84. The valve 82 is configured to allow relatively unrestricted flow from the lower part 39b to the upper part 38a of the reservoir when the plunger 26 is moving upwardly, However, the valve 82 only opens to permit flow in the opposite direction when there is a substantial pressure differential across the wall 80. Similarly, the length and diameter of the coil tube 84 is selected such that a substantial differential pressure is required to initiate flow through the tube 84.

A pendulum seat 86 is provided above the wall 80 in the upper volume 36a and is configured to accommodate the pendulum 46 when the plunger 26 is in its lowermost position, as illustrated in FIG. 2.

The floating piston 42 which defines the lower wall of the volume 38 is biassed upwardly by a pair of return springs 88, 89 located within a further oil-filled volume 90 defined by the lower end of the sleeve 40, the lower face of the piston 42, and a bladder 92. The springs 88, 89 tend to push the piston 42 upwardly to compress the oil within the volume 38 and thus push the plunger 26 upwardly towards the position illustrated in FIG. 1. This arrangement has the advantage that the oil in the volume 38 is constantly pressurised, which ensures that the oil seals 96 are always energised by a positive pressure inside the volume 38. This constant energisation of the seals in one direction minimises oil leaks and the positive pressure inside the volume 38 prevents any tendency for drilling fluid to be drawn into the volume 38 during the upward stroke of the plunger 26, as described below.

In use, the drift indicator 10 is located in a drill string, just above the drilling bit. During normal drilling operation the indicator 10 simply acts as part of the drill string, with drilling mud passing through the passage 20 and the annulus 36. The dimensions of the plunger head 24 and the ratings of the springs 88, 89 are selected such that the flow of mud will retain the plunger 26 in a first position with the head 24 resting on the upper end of the body portion 30, and the pendulum 46 in the seat 86, as illustrated in FIG. 2. If the operator wishes to measure the deviation of the hole from the vertical, the bit is pulled off bottom, rotation of the string is stopped, and then the mud circulationpumps are shut down. When the flow of mud through the passage 20 stops, the springs 88, 89, acting via the piston 42 and the oil in the volume 38, pushes the plunger 26 upwardly, and also lifts the pendulum 46. As the pendulum 46 is pivotally mounted to the plunger 26 it assumes a vertical position such that if the indicator 10 is inclined to the vertical the pendulum 48 will lie at an angle relative to the indicator body. Thus, as the pendulum 46 rises it will engage one of the teeth 44, and arrest further movement of the plunger 26, as illustrated in FIGS. 3 and S. Alternatively, if the indicator 10 is lying vertically the pendulum 46 will travel upwardly, past the teeth 44, until encountering a stop 94 provided by the lower end of the body portion 30, as illustrated in FIG. 1. Thus, the upward movement of the plunger 26 moves the plunger head 24 into the sleeve 16 to a position corresponding with the arrested position of the pendulum 46.

Before the pendulum 46 engages one of the teeth 44, the pendulum is free to pivot on the small area pivot surface 78 defined by the pivot pin 56. However, as described above, once the pendulum 46 engages one of the teeth 44 the load experienced by the pivot connection increases sharply, causing the spring 74 to compress and transferring the load to the surface of the ball 53 and the seat 76.

If the mud pumps are activated once more, and the mud flow brought up to, for example, 400 gallons per minute, there will be build-up of mud pressure above the plunger head 24. However, the plunger 26 will not move downwardly immediately as the crack valve 82 and coil tube 84 will not permit flow of oil through the wall so, Movement of the plunger 26 only occurs when the pressure differential across the indicator 10 reaches a predetermined level (typically 200 psi). Once the crack valve 82 has opened, the plunger 26 may move downwardly into the sleeve 40 while the valve 82 and tube 84 continue to provide resistance to movement of the plunger, to ensure that the plunger 26 moves smoothly and steadily. As the plunger 26 moves downwardly, the head 24 passes the flow restrictions 22 thus varying the cross-sectional flow area past the head 24; as described above, the dimensions of the flow restrictions 22 and the head 24 are selected such that flow area is substantially restricted when the head 24 is adjacent a restriction 22. This results in a significant pressure pulse in the drilling mud, which is readily detected at the surface, simply by monitoring an existing mud pressure gauge. By counting the number of pulses, which occur every two to three seconds, the operator may determine the drift or inclination of the tool, and thus the drift of the drilled hole.

It will be clear to those of skill in the art that the above-described embodiment is merely exemplary of the present invention, and that various modifications and improvements may be made thereto, without departing from the scope of the invention.

What is claimed is:

1. A downhole drift indicator comprising:

a housing for location in a drill string and defining a passage for drilling fluid;

a restriction body defining a series of flow restrictions in the passage;

a restriction member for co-operating with the flow restrictions to define a restricted flow area when located adjacent one of the flow restrictions, said restriction member being movable in one direction relative to the housing under the influence of the flow of drilling fluid through the passage, towards a first position;

return means for biassing the restriction member in the other direction, towards a second position; and a drift responsive member being movable relative to the housing and the restriction member and pivotally connected to the restriction member, the pivot connection including a pivot member connecting the restriction member and the drift responsive member, wherein on the pivot connection being subject to a predetermined load, surfaces of the restriction member and drift responsive member engage to limit the load experienced by the pivot member, the degree of movement of said drift responsive member in said other direction from a respective first position being related to the inclination of the housing, the arrangement being such that, in use, reducing the flow of drilling fluid through the passage results in movement of said restriction member in said other direction from said first position until arrested by the drift responsive member, and restarting the flow of fluid resulting in movement of said restriction member from the arrested position towards said first position, the reduction in flow area resulting as the restriction member passes each flow restriction producing a pressure pulse in the drilling fluid, which pulse is detectable at the surface, the number of pulses indicating the degree of drift.

2. The indicator of claim 1, wherein the restriction member cooperates with the flow restrictions to define a minimal flow area when located adjacent a flow restriction such that, in use, the magnitude of the pulses is such that the pulses may be counted by the operator simply by monitoring an existing drilling fluid pressure gauge at the surface.

3. The indicator of claim 2, wherein the flow area defined between the restriction member and an adjacent restriction is no more than 60% of the flow area when the restriction member is spaced from a restriction.

4. The indicator of claim 2, wherein the flow area defined between the restriction member and an adjacent restriction is around 40% of the flow area when the restriction member is spaced from a restriction.

5. The indicator of claim 1, wherein damping means is provided for damping the movement of the restriction member and the drift responsive member.

6. The indicator of claim 5, wherein the damping means only permits movement of the restriction member once a predetermined fluid pressure force is exerted on the restriction member.

7. The indicator of claim 1, wherein the drift responsive member is engageable with a selected one of a series of graduated engagement members defined by the housing.

8. The indicator of claim 7, wherein the engagement members are in the form of annular or part-annular teeth, and the pivotally mounted drift responsive member is a pendulum.

9. The indicator of claim 8, wherein the pendulum is located within a fluid reservoir, isolated from the drilling fluid.

10. The indicator of claim 9, wherein the return means acts on the restriction member through the fluid reservoir.

11. The indicator of claim 10, wherein the movable wall is a floating piston and the return means acts against the piston.

12. The indicator of claim 10, wherein the return means maintains the fluid reservoir under pressure.

13. The indicator of claim 9, wherein the reservoir includes a moveable wall.

14. A combination of a downhole drift indicator and a mounting arrangement for a pivotable member of the downhole drift indicator, the combination comprising:

relatively movable first and second members of the downhole drift indicator defining respective normally spaced apart first and second surfaces;

a pivot connection between the members including a pivot member connecting the first and the second members; and wherein the first and the second surfaces are capable of engaging one another on said pivot connection experiencing a predetermined load to limit said load experienced by said pivot connection, wherein the first member is a plunger and the second member is a pendulum of the downhole drift indicator.

15. The arrangement of claim 14, in which the pivot connection permits pivoting of the second member relative to the fist member, the pivot member defining a pivot surface for supporting the second member.

16. The arrangement of claim 15, wherein the pivot surface is one of a point and line.

17. The arrangement of claim 14, in which the pivot member is linked to the first member through a resilient deformable mounting which deforms under said predetermined load to allow the second member to move relative to the first member and the first and second surfaces to engage.

18. The arrangement of claim 17, wherein the pivot member is spring mounted.

19. The arrangement of claim 14, wherein the first and second surfaces are part-spherical.

* * * * *